United States Patent
Fujiwara et al.

[11] Patent Number: 6,091,741
[45] Date of Patent: *Jul. 18, 2000

[54] RADIO PACKET COMMUNICATION SYSTEM CAPABLE OF AVOIDING TRANSMISSION COLLISION

[75] Inventors: Ryuhei Fujiwara; Yukitsune Furuya, both of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/747,038

[22] Filed: Nov. 8, 1996

[30] Foreign Application Priority Data

Nov. 10, 1995 [JP] Japan .................. 7-292857

[51] Int. Cl.⁷ ................................. H04J 3/16
[52] U.S. Cl. ................ 370/465; 370/346; 370/443; 370/447; 370/449; 340/825.06
[58] Field of Search ................. 370/465, 468, 370/338, 437, 443, 445, 447, 449, 345, 346, 444, 446, 448, 467, 466; 340/825.07, 825.08, 825.06

[56] References Cited

U.S. PATENT DOCUMENTS 5,012,469 4/1991 Sardana .................. 370/95.3

FOREIGN PATENT DOCUMENTS

| | | |
|---|---|---|
| 286134 | 10/1988 | European Pat. Off. . |
| 321454 | 6/1989 | European Pat. Off. . |
| 57-44353 | 3/1982 | Japan . |
| 60-208138 | 10/1985 | Japan . |
| 61-253944 | 11/1986 | Japan . |
| 5-48610 | 2/1993 | Japan . |
| 91 16775 | 10/1991 | WIPO . |

OTHER PUBLICATIONS

R.C. Sunlin, "A Hybrid Distributed Slot Assignment TDMA Channel Access Protocol", IEEE Military Communications Conference, vol. 3, Sep. 30–Oct. 3, 1990, pp. 934–938.

*Primary Examiner*—Douglas W. Olms
*Assistant Examiner*—Shick Hom
*Attorney, Agent, or Firm*—Ostrolenk, Faber, Gerb & Soffen, LLP

[57] ABSTRACT

In a radio packet communication system between a master station and a plurality of slave stations, a contention mode is switched to a polling mode or vice versa in accordance with the amount of transmission data reserved by the slave stations to the master station.

7 Claims, 9 Drawing Sheets

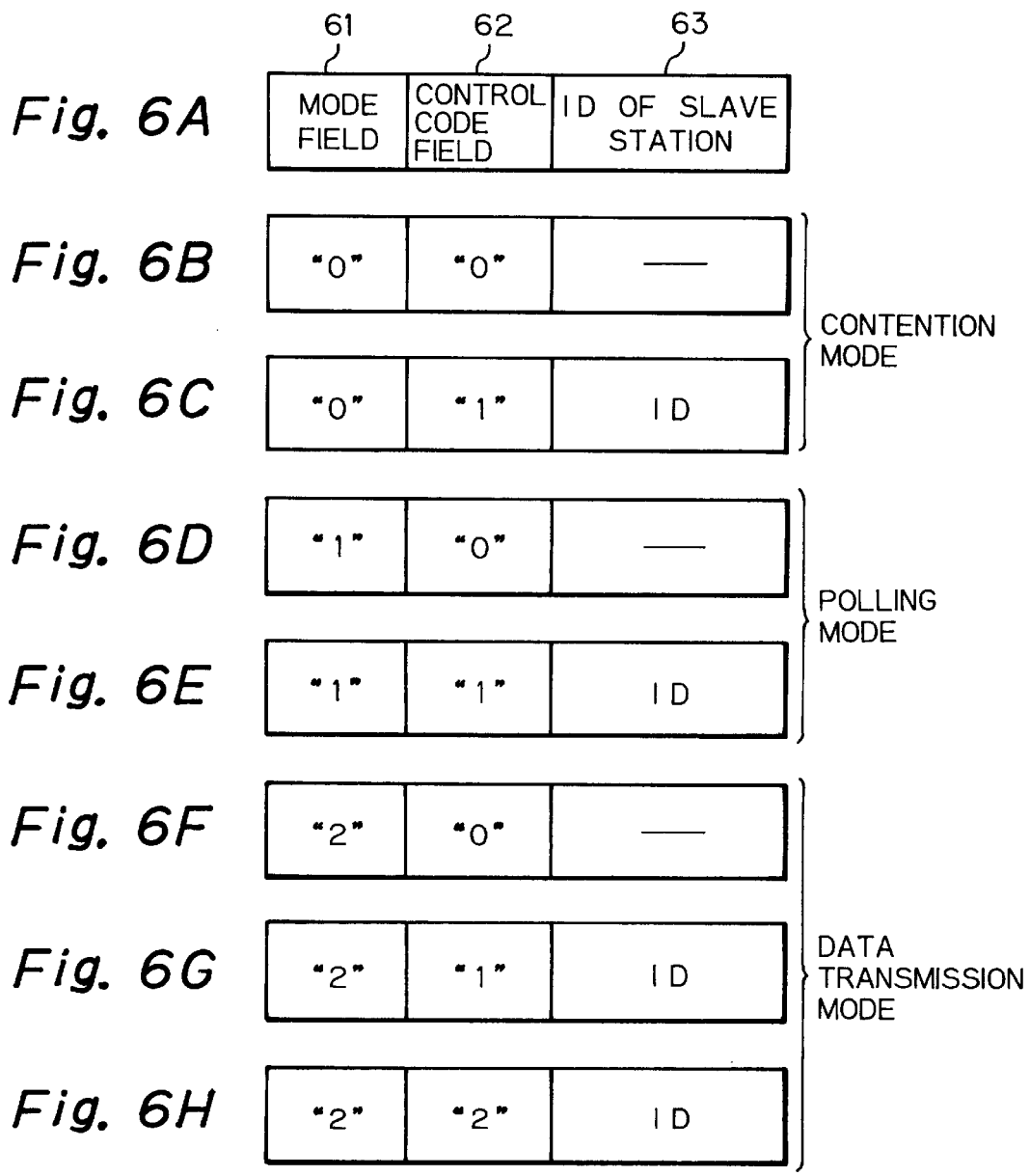

RADIO PACKET COMMUNICATION SYSTEM CAPABLE OF AVOIDING TRANSMISSION COLLISION

BACKGROUND OF THE INVENTION

1. Field of the Invention

The present invention relates to a radio packet communication system between a master station and slave stations, and more particularly, to a radio packet communication system capable of avoiding transmission collision of packets transmitted by the slave stations.

2. Description of the Related Art

In radio packet communication systems, there is a contention mode and a polling mode.

In the contention mode, a slave station having a transmission request transmits a reservation signal for requesting a transmission to a master station at a voluntary timing, and as a result, the master station gives an exclusive transmission right to the slave station in accordance with the reservation signal. In the contention made, since only slave stations having transmission requests can obtain exclusive transmission right, the transmission can begin immediately without having to wait. However, when the number of slave stations having transmission requests is increased, transmission collision between reservation signals may occur, so that a time required for obtaining the exclusive transmission right may become invalid.

On the other hand, in the polling mode, a transmission right for a reservation signal is sequentially allocated from the master station to all the slave stations. Therefore, there is no collision between transmission data from the slave stations. However, since a transmission right for a reservation signal is allocated to slave stations having no transmission requests, a wait time may be required until slave stations having transmission requests obtain transmission rights, and also, an invalid time period for data transmission may occur.

In a prior art radio packet communication system, in order to effectively make use of both of the contention mode having no wait time and the polling mode having no collision, the contention mode is switched to the polling mode or vice versa in accordance with the occurrence of transmission collision between the slave stations (see JP-A-5-48610).

In the above-mentioned radio packet communication system, however, switching between the contention mode and the polling mode is not smooth.

SUMMARY OF THE INVENTION

It is an object of the present invention to provide a radio packet communication system which can smoothly switch a contention mode to a polling mode or vice versa.

According to the present invention, in a radio packet communication system between a master station and a plurality of slave stations, a contention mode is switched to a polling mode or vice versa in accordance with the amount of transmission data reserved by the slave stations to the master station. Thus, in the contention mode, since the occurrence of transmission collision is anticipated in advance by the reserved transmission data, the contention mode can be smoothly switched to the polling mode. Conversely, in the polling mode, if the reserved transmission data is small, the polling mode can be switched to the contention mode.

BRIEF DESCRIPTION OF THE DRAWINGS

The present invention will be more clearly understood from the description as set forth below, with reference to the accompanying drawings, wherein:

FIGS. 6A through 6H are diagrams showing formats of access signals from the master station to the slave stations of FIG. 1;

DESCRIPTION OF THE PREFERRED EMBODIMENTS

Figure 1:
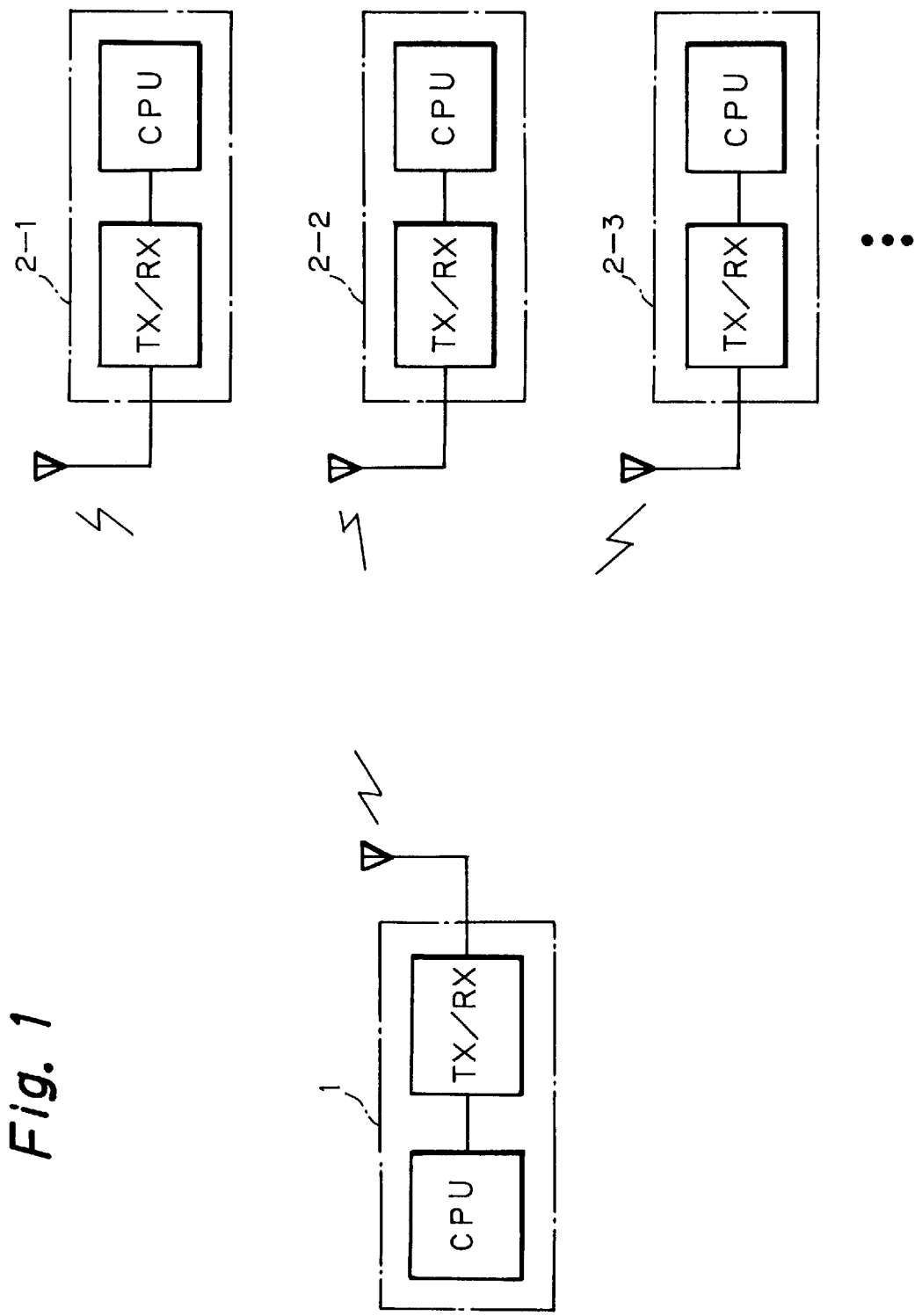
FIG. 1 is a diagram illustrating an embodiment of the radio packet communication system according to the present invention.

In FIG. 1, which illustrates an embodiment of the present invention, reference numeral 1 designates a master station including a central processing unit (CPU) and a tranceiver, and 2-1, 2-2, 2-3, ... designate slave stations each including a CPU and a transceiver.

Figure 2:
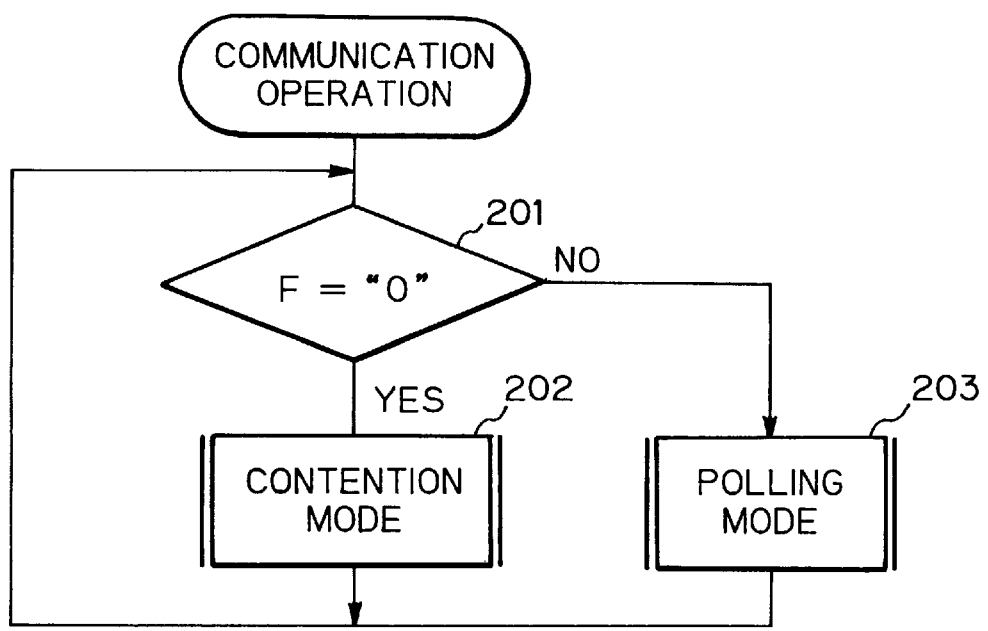
FIG. 2 is a flowchart showing the operation of the master station of FIG. 1.

The operation of the CPU of the master station 1 is shown in FIG. 2. That is, at step 201, it is determined whether or not a flag F is "0". The calculation of the flag F will be explained later in detail.

As a result, if F="0", the control proceeds to step 202 which carries out a contention mode. Contrary to this, if F="1", the control proceeds to step 203 which carries out a polling mode. The contention mode and the polling mode will also be explained later in detail.

Then, the control at steps 202 and 203 returns to step 201.

Figure 3A:
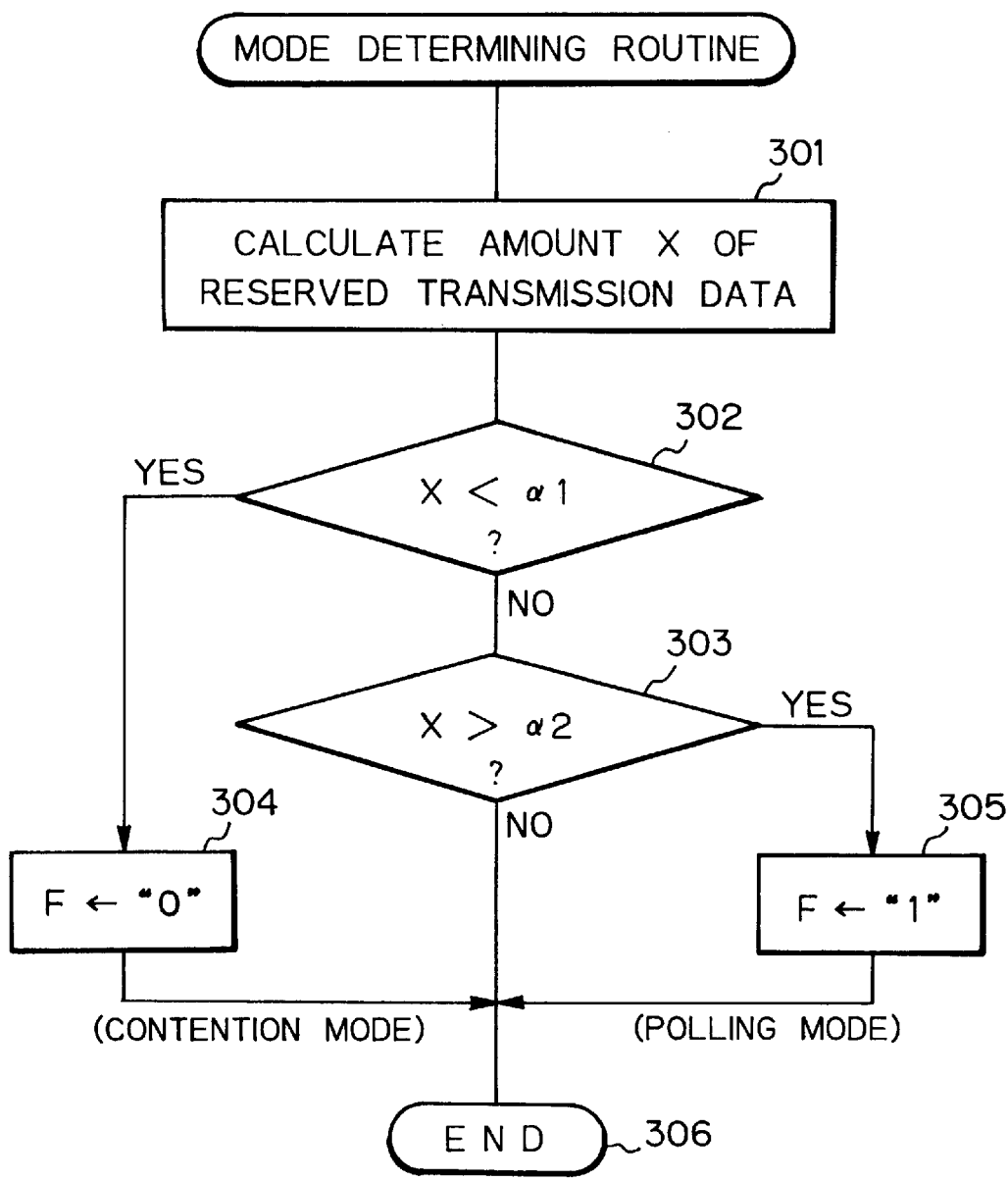
FIGS. 3A, 4A and 5A are also flowcharts showing the operation of the master station of FIG. 1.
Figure 4A:
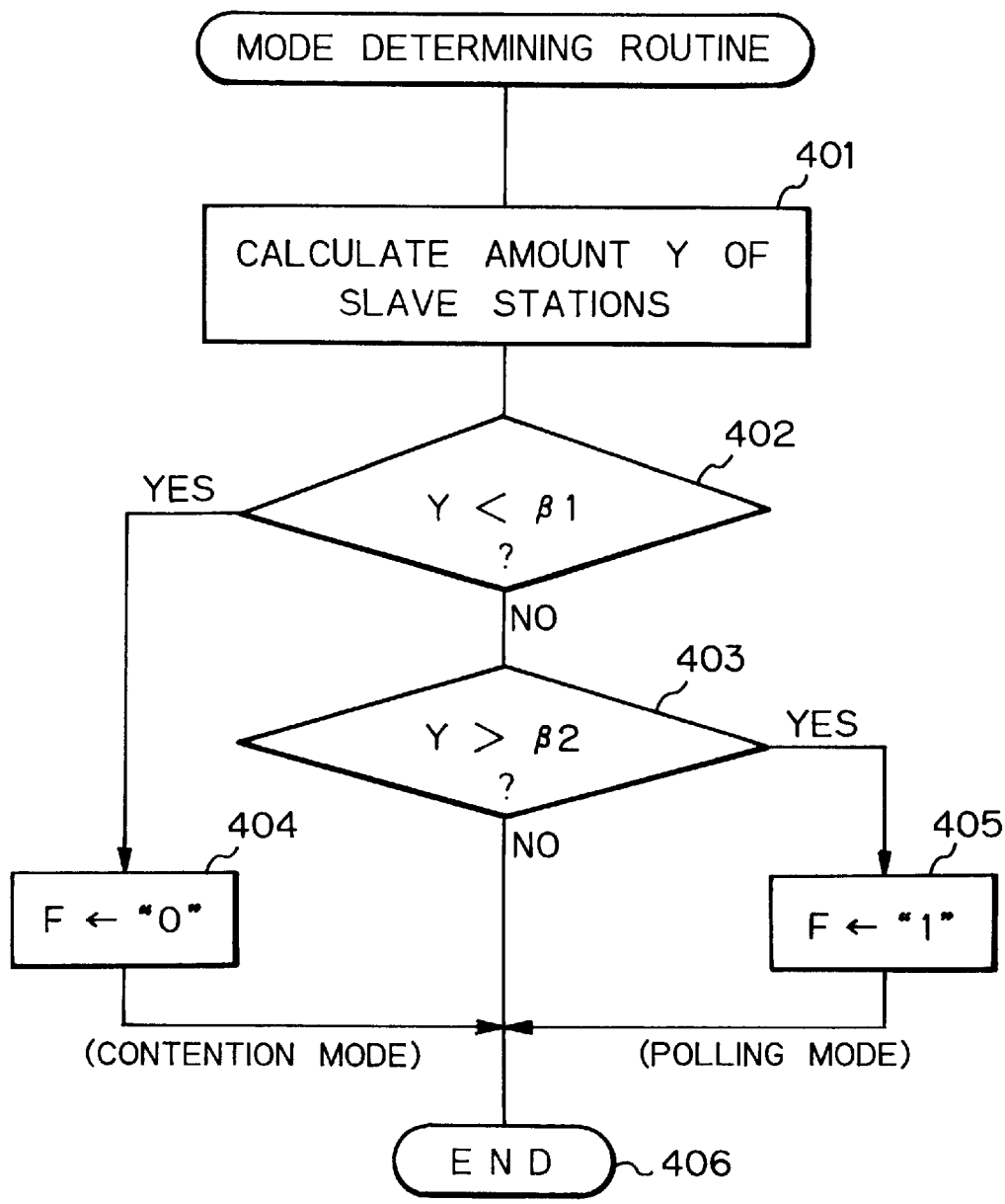
Figure 5A:
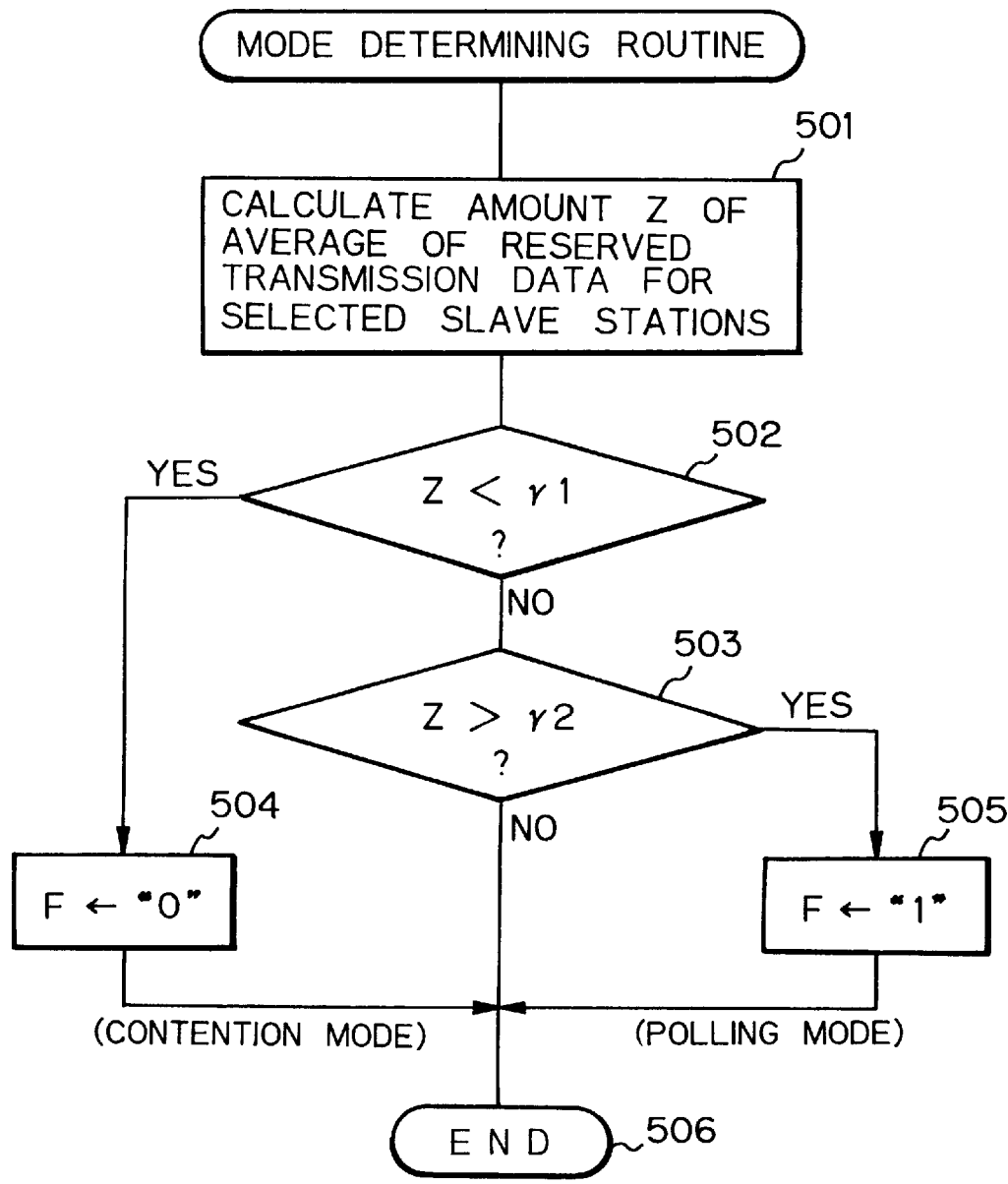

The flag F at step 201 of FIG. 2 is determined by one of the flowcharts of FIGS. 3A, 4A and 5A, the operation shown therein being started by a timing when an amount of reservation signals transmitted by the slave stations 2-1, 2-2, 2-3, ... reaches a predetermined value.

Referring to FIG. 3A, at step 301, an amount X of transmission data which has been reserved by the slave stations 2-1, 2-2, 2-3, ... is calculated.

Next, at step 302, it is determined whether or not $X<\alpha 1$. Also, at step 303, it is determined whether or not $X>\alpha 2$. In this case, $\alpha 1<\alpha 2$. As a result, if $X<\alpha 1$, the control proceeds to step 304 which resets the flag F, i.e., F="0" (contention mode). Conversely, if $X>\alpha 2$, the control proceeds to step 305 which sets the flag F, i.e., F="1" (polling mode). Also, if $\alpha 1 \leq X \leq \alpha 2$, the control directly proceeds to step 306, and thus, the flag F is unchanged.

Thus, when the reserved transmission data amount X falls below $\alpha 1$, the polling mode is switched to the contention mode. Also, when the reserved transmission data amount X rises above $\alpha 2$, the contention mode is switched to the polling mode.

Figure 3B:
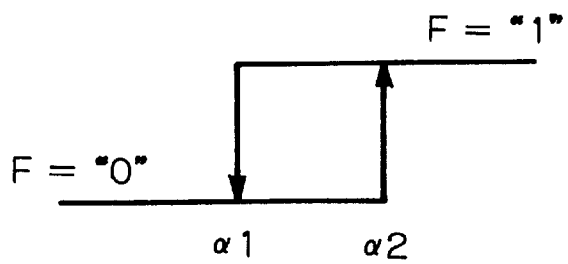
FIGS. 3B, 4B and 5B are diagrams showing the contants of FIGS. 3A, 4A and 5A, respectively.

Note that, since the value $\alpha$ is different from the value $\alpha 2$, the flag F is controlled as shown in FIG. 3B, thus avoiding chattering of the flag F. This stabilizes the communication operation.

Referring to FIG. 4A, at step 401, the number Y of slave stations having an amount of reserved transmission data larger than a predetermined value is calculated.

Next, at step 402, it is determined whether or not Y<β1. Also, at step 403, it is determined whether or not Y>β2. In this case, β1<β2. As a result, if Y<β1, the control proceeds to step 404 which resets the flag F. i.e., F="0" (contention mode). Conversely, if Y>β2, the control proceeds to step 405 which sets the flag F, i.e., F="1" (polling mode). Also, if β1≦Y≦β2, the control directly proceeds to step 406, and thus, the flag F is unchanged.

Thus, when the slave station amount Y falls below β1, the polling mode is switched to the contention mode. Also, when the slave station amount Y rises above β2, the contention mode is switched to the polling mode.

Figure 4B:
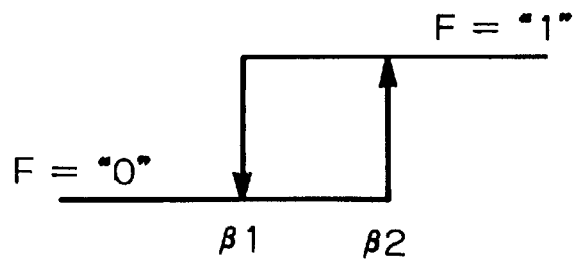

Note that, since the value β1 is different from the value β2, the flag F is controlled as shown in FIG. 4B, thus avoiding chattering of the flag F. This stabilizes the communication operation.

Referring to FIG. 5A, at step 501, slave stations having an amount of reserved transmission data larger than a predetermined value are selected, the average amount Z of reserved transmission data for the selected slave stations is calculated.

Next, at step 502, it is determined whether or not Z<γ1. Also, at step 503, it is determined whether or not Z>γ2. In this case, γ1<γ2. As a result, if Z<γ1, the control proceeds to step 504 which resets the flag F, i.e., F="0" (contention mode). Conversely, if Z>γ2, the control proceeds to step 505 which sets the flag F, i.e., F="1" (polling mode). Also, if γ1≦Z≦γ2, the control directly proceeds to step 506, and thus, the flag F is unchanged.

Thus, when the average reserved transmission data amount Z falls below γ1, the polling mode is switched to the contention mode. Also, when the average reserved transmission data amount Z rises above γ2, the contention mode is switched to the polling mode.

Figure 5B:
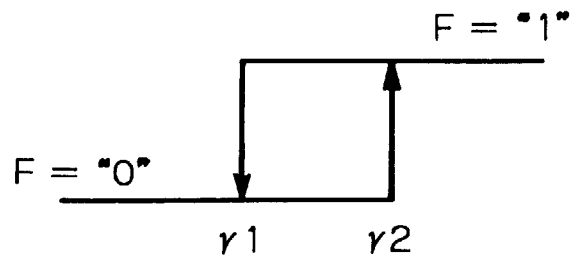

Note that, since the value γ1 is different from the value γ2, the flag F is controlled as shown in FIG. 5B, thus avoiding chattering of the flag F. This stabilizes the communication operation.

FIGS. 6A through 6H are diagrams of formats of access signals from the master station 1 to the slave stations 2-1, 2-2, 2-3, . . . That is, a mode field 61, a control code field 62 and a slave station identification (ID) field 63 are provided. If the mode field 61 stores "0" as shown in FIGS. 6B and 6C, the control mode is the contention mode; if the mode field 61 stores "1" as shown in FIGS. 6D and 6E, the control mode is the polling mode; and if the mode field 61 stores "2" as shown in FIGS. 6F, 6G and 6H, the control mode is a data transmission mode. In the contention mode, if the control code field 62 is "0" as shown in FIG. 6B, this means a reservation permission, and if the control code field 62 is "1" as shown in FIG. 6C, this means an acknowledgement of a reservation signal. Also, in the polling mode, if the control code field 62 is "0" as shown in FIG. 6D, this means an unused state, and if the control code field 62 is "1" as shown in FIG. 6E, this means a reservation permission. Further, in the data transmission mode, if the control code field 62 is "0" as shown in FIG. 6F, this means an unused state, if the control code field 62 is "1" as shown in FIG. 6G, this means a data transmission permission; and if the control code field 62 is "2" as shown in FIG. 6H, this means an acknowledgement of data reception.

Figure 7A:
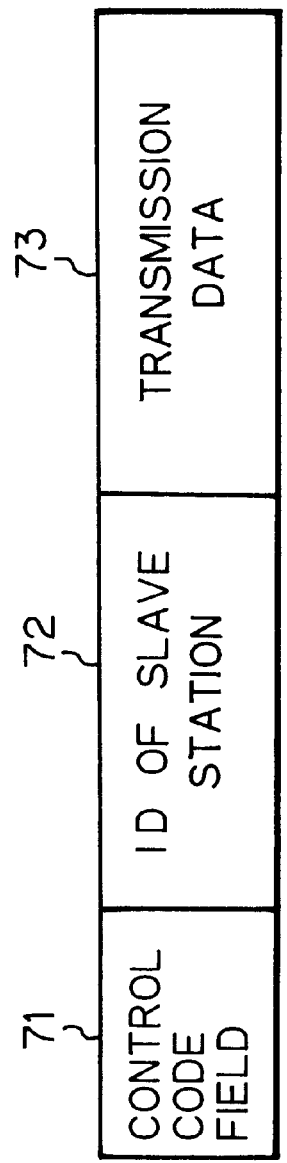
FIGS. 7A, 7B and 7C are diagrams showing formats of access signals from the slave stations to the master station of FIG. 1.
Figure 7B:
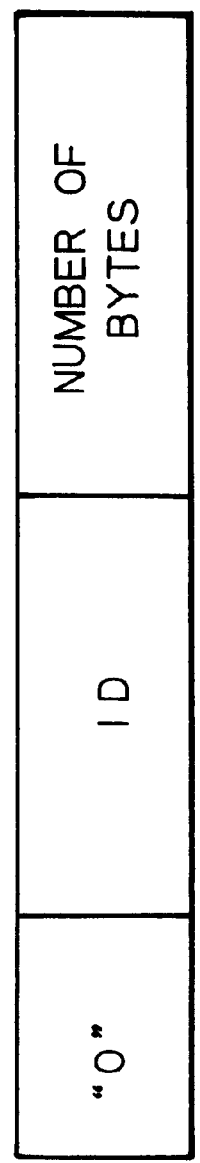
Figure 7C:
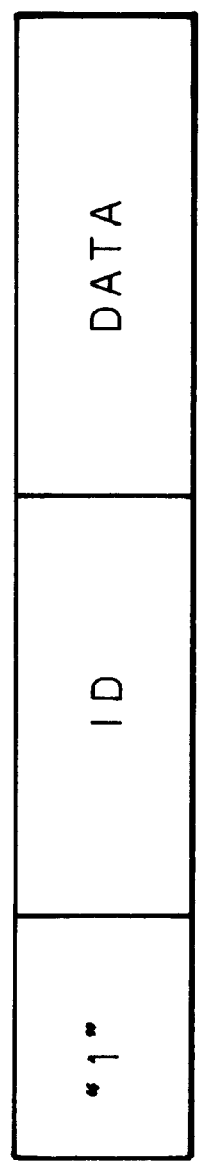

FIGS. 7A, 7B and 7C are diagrams of formats of access signals from the slave station 2-1, 2-2, 2-3, . . . to the master station 1, in which a control code field 71, a slave station ID field 72 and a data field 73 are provided. If the control field 71 is "0" as shown in FIG. 7B, this means a transmission reservation request, and if the control field 71 is "1" as shown in FIG. 7C, this means an actual data transmission.

Figure 8:
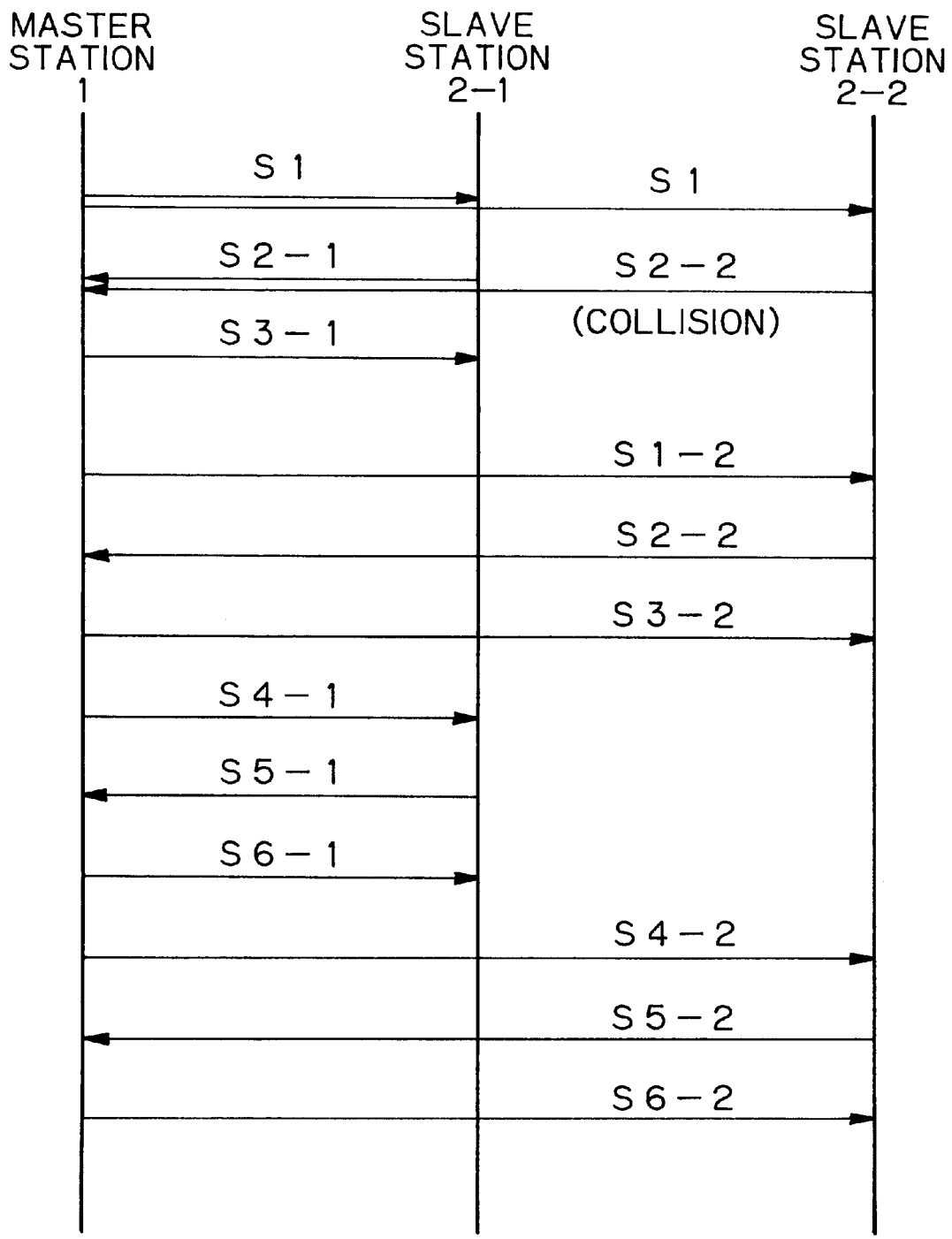
FIG. 8 is a sequence diagram showing the contention mode of FIG. 2.

The contention mode of FIG. 2 is explained next with reference to FIG. 8. In FIG. 8, only the slave stations 2-1 and 2-2 are illustrated and the other slave stations are omitted for simplifying the description.

First, the master station 1 generates a reservation permission signal S1 as shown in FIG. 6B and transmits it to the slave stations 2-1 and 2-2. As a result, the slave stations 2-1 and 2-2 generate transmission reservation request signals S2-1 and S2-2, respectively, associated with the bytes of transmitting data, as shown in FIG. 7B, and transmit them to the master station 1. In this case, as shown in FIG. 8, the transmission reservation request signal S2-1 collides with the transmission reservation request signal S2-2, and therefore, only one of the signals such as S2-1 is received by the master station 1. Thus, the master station 1 generates an acknowledgement signal S3-1 of the transmission reservation request signal S2-1 as shown in FIG. 6C, and transmits it to the slave station 2-1.

After a predetermined time has passed, the master station 1 again generates a reservation permission signal S2 as shown in FIG. 6B and transmits it to the slave stations 2-1 and 2-2. As a result, the slave station 2-2 generates a transmission reservation request signal S2-2, associated with the bytes of transmitting data as shown in FIG. 7B, and transmits it to the master station 1. Then, the master station 1 generates an acknowledgement signal S3-2 of the transmission reservation request signal S2-2 as shown in FIG. 6C, and transmits it to the slave station 2-2.

Further, after a predetermined time has passed, the master station 1 generates a data transmission permission signal S4-1 as shown in FIG. 6G and transmits it to the slave station 2-1. Then, the slave station 2-1 generates a transmission data signal S5-1 as shown in FIG. 7C and transmits it to the master station 1. Finally, the master station 1 generates an acknowledgement signal S6-1 as shown in FIG. 6H and transmits it to the slave station 2-1.

Subsequently, the master station 1 generates a data transmission permission signal S4-2 as shown in FIG. 6G and transmits it to the slave station 2-2. Then, the slave station 2-2 generates a transmission data signal S5-2 as shown in FIG. 7C and transmits it to the master station 1. Finally, the master station 1 generates an acknowledgement signal S6-2 as shown in FIG. 6H and transmits it to the slave station 2-2.

Thus, in the contention mode, transmission right is sequentially allocated to the slave stations whose transmission reservation request signals are already received by the master station 1.

Figure 9:
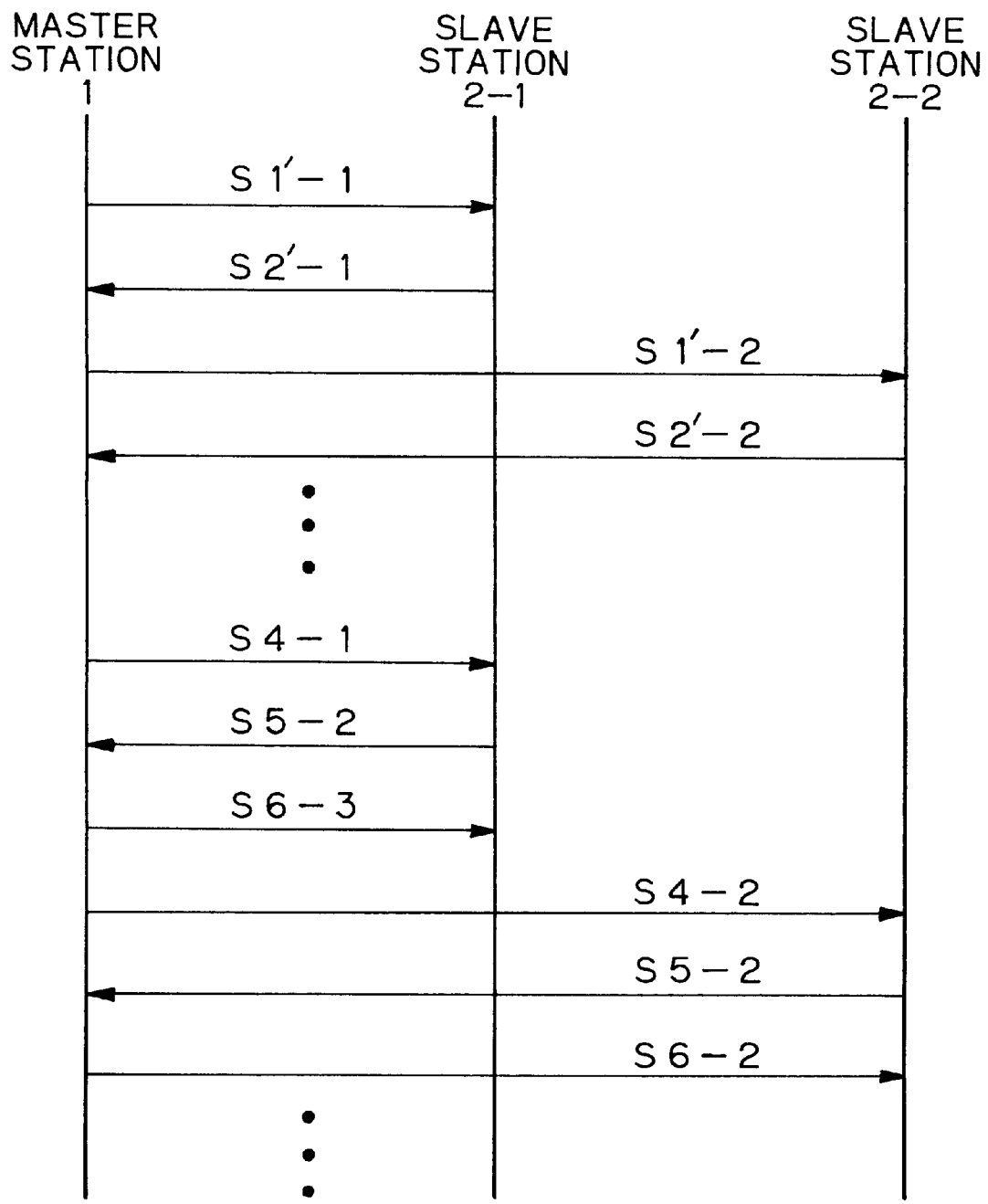
FIG. 9 is a sequence diagram showing the polling mode of FIG. 2.

The polling mode of FIG. 2 is explained next with reference to FIG. 9. Also, in FIG. 9, only the slave stations 2-1 and 2-2 are illustrated and the other slave stations are omitted for simplifying the description.

First, the master station 1 generates a reservation permission signal, i.e., a polling signal S1'-1 as shown in FIG. 6D and transmits it to the slave station 2-1. As a result, if the slave station 2-1 has data to be transmitted to the master station 1, the slave station 2-1 generates a transmission reservation request signal S2'-1 associated with the bytes of transmitting data, as shown in FIG. 7B, and transmits it to the master station 1. Subsequently, the master station 1 generates a polling signal S1'-2 as shown in FIG. 6D and transmits it to the slave station 2-2. As a result, if the slave station 2-2 has data to be transmitted to the master station 1, the slave station 2-2 generates a transmission reservation request signal S2'-2 associated with the bytes of transmitting data, as shown in FIG. 7B, and transmits it to the master station 1. Subsequently, the master station 1 performs the same polling operation upon the other slave stations.

Subsequently, the master station 1 generates a data transmission permission signal S4-1 as shown in FIG. 6G and transmits it to the slave station 2-1. Then, the slave station 2-1 generates a transmission data signal S5-1 as shown in FIG. 7C and transmits it to the master station 1. Finally, the master station 1 generates an acknowledgement signal S6-1 as shown in FIG. 6H and transmits it to the slave station 2-1.

Also, the master station 1 generates a data transmission permission signal S4-2 as shown in FIG. 6G and transmits it to the slave station 2-2. Then, the slave station 2-2 generates a transmission data signal S5-2 as shown in FIG. 7C and transmits it to the master station 1. Finally, the master station 1 generates an acknowledgement signal S6-2 as shown in FIG. 6H and transmits it to the slave station 2-2.

The master station 1 performs the same data transmission operation upon the other slave stations.

Thus, in the polling mode, transmission right is sequentially allocated to all the slave stations.

As explained hereinabove, according to the present invention, since switching of the contention mode and the polling mode is carried out in accordance with the amount of transmission data reserved by the slave stations, such switching can be smoothly carried out.

What is claimed is:

1. A radio packet communication system comprising:

a master station; and a plurality of slave stations;

each of said slave stations generating a transmission reservation request signal with an identification number and an amount of transmission data to be reserved upon receipt of a reservation permission signal from said master station, said master station comprising:

a contention mode operating means for performing a contention mode operation upon said master station and said slave stations;

a polling mode operating means for performing a polling mode operation upon said master station and said slave stations; and a switching means for switching between said contention mode operating means and said polling mode operating means in accordance with the amount of transmission data reserved by said slave stations for transmission to said master station, said switching means switching to said contention mode if the amount of reserved transmission data is less than a first amount and switching to said polling mode if the amount of reserved transmission data is greater than a second amount, where the second amount is greater than the first amount.

2. The system as set forth in claim 1, wherein said switching means switches said polling mode operating means to said contention mode operating means when the amount of transmission data is small, and said switching means switches said contention mode operating means to said polling mode operating means when the amount of transmission data is large.

3. The system as set forth in claim 1, further comprising:

means for calculating the amount of transmission data reserved by said slave stations to said master station every time a number of reservations by said slave stations reaches a predetermined value;

means for determining whether or not the amount of transmission data is smaller than a first value; and means for determining whether or not the amount of transmission data is larger than a second value larger than said first value, said switching means switching said polling mode operating means to said contention mode operating means when the amount of transmission data is smaller than said first value, said switching means switching said contention mode operating means to said polling mode when the amount of transmission data is larger than said second value.

4. The system as set forth in claim 1, further comprising:

means for calculating a number of slave stations having an amount of reserved transmission data larger than a predetermined value at every time when a number of reservations by said slave stations reaches a predetermined value;

means for determining whether or not said number of slave stations is smaller than a first value; and means for determining whether or not said number of slave stations is larger than a second value larger than said first value, said switching means switching said polling mode operating means to said contention mode operating means when the amount of transmission data is smaller than said first value, said switching means switching said contention mode operating means to said polling mode operating means when the amount of transmission data is larger than said second value.

5. The system as set forth in claim 1, further comprising:

means for selecting slave stations having an amount of reserved transmission data larger than a predetermined value every time a number of reservations by said slave stations reaches said predetermined value;

means for calculating an average amount of reserved transmission data for said selected slave stations;

means for determining whether or not said average amount of transmission data is smaller than a first value; and means for determining whether or not said average amount of transmission data is larger than a second value larger than said first value, said switching means switching said polling mode operating means to said contention mode operating means when the amount of transmission data is smaller than said first value, said switching means switching said contention mode operating means to said polling mode operating means when the amount of transmission data is larger than said second value.

6. A radio packet communication system comprising:

a master station; and a plurality of slave stations, each of said slave stations generating a transmission reservation request signal with an identification number and an amount of transmission data to be reserved upon receipt of a reservation permission signal from said master station, said master station comprising:

a contention mode operating unit which performs a contention mode operation upon said master station and said slave stations;

a polling mode operating unit which performs a polling mode operation upon said master station and said slave stations; and a switching unit which switches between said contention mode operating unit and said polling mode operating unit in accordance with the amount of transmission data reserved by said slave stations for transmission to said master station, said switching unit switching to contention mode if the amount of reserved transmission data is less than a first amount and switching to polling mode if the amount of reserved transmission data is greater than a second amount, where the second amount is greater than the first amount.

7. A radio packet communication system including a master station and a plurality of slave stations, each of said slave stations transmitting a reservation signal for requesting a transmission to said master station in a contention mode, so that said master station gives an exclusive transmission right to said each of said slave stations, said master station comprising:

a contention mode operation means for performing a contention mode operation upon said slave stations;

a polling mode operation means for performing a polling mode operation upon said slave stations, said master station sequentially giving said transmission right to all said slave stations when operating in said polling mode; and a switching means for switching between said contention mode operation means and said polling mode operation means in accordance with an amount of transmission data reserved by said slave stations for transmission to said master station, said switching means switching to contention mode if the amount of reserved transmission data is less than a first amount and switching to polling mode if the amount of reserved transmission data is greater than a second amount, where the second amount is greater than the first amount.

* * * * *